United States Patent [19]

Mattox

[11] 4,416,464

[45] Nov. 22, 1983

[54] SPRING ASSIST DRIVE FOR CYCLE

[76] Inventor: Robert G. Mattox, 4846 Radford, North Hollywood, Calif. 91607

[21] Appl. No.: 299,809

[22] Filed: Sep. 8, 1981

[51] Int. Cl.³ .............................................. B62M 1/10
[52] U.S. Cl. .................................................. 280/215
[58] Field of Search ............ 280/212, 214, 215, 289 G

[56] References Cited

U.S. PATENT DOCUMENTS

| Re. 28,335 | 2/1975 | Wood | 280/289 G |
|---|---|---|---|
| 635,664 | 10/1899 | Coursey et al. | 280/215 |
| 1,015,996 | 1/1912 | Corbitt | 280/215 |
| 1,612,739 | 12/1926 | Matsumoto | 280/215 |
| 2,277,391 | 3/1942 | Crumble | 280/215 |

Primary Examiner—John A. Pekar
Assistant Examiner—D. Lynn Fugate
Attorney, Agent, or Firm—Vernon D. Beehler

[57] ABSTRACT

A spring assist drive for pedal operated vehicles such as bicycles and tricycles makes use of a wind-up spring in the train of power from the pedal operated power sprocket to the drive sprocket for the rear drive wheel. The wind-up spring is a coil spring, the inside end of which is anchored to an axle for a relatively smaller sprocket in chain driving engagement with the sprocket on the rear drive wheel. The outside end of the spring is anchored to a relatively larger sprocket and chain driven from the pedal operated power sprocket.

6 Claims, 5 Drawing Figures

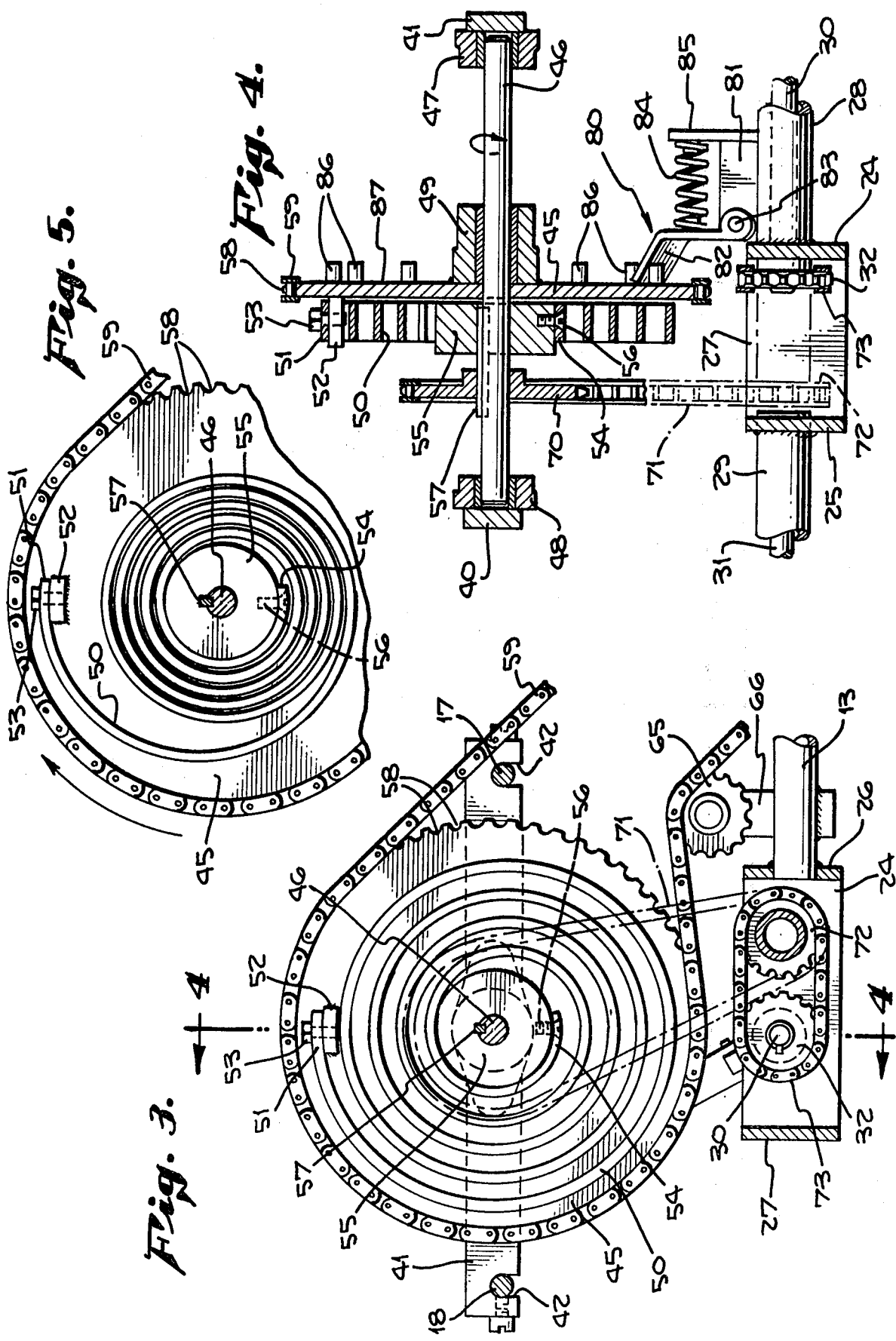

SPRING ASSIST DRIVE FOR CYCLE

Accompanying the increased popularity for bicycles, and to a degree tricycles, various innovations in the drive have been undertaken. The most popular of such innovations consists of a gearshift bicycle with a control on the handlebar so that the operator, while riding, can shift from high gear to intermediate gear to low gear and then again to intermediate and high gears as the operator might wish. Equipment of this kind contributes appreciably to the comfort of the operator in that for level ground high gear can be used so that with moderate effort the cycle can be ridden at a good speed. For upgrade the shift to intermediate or even low speed is of great assistance in enabling the operator to pedal up a grade which, without the gearshift, might be beyond his capability or, in any event, beyond the desire of the operator to exert that much effort. For such gearshift cycles, hand brakes are customarily employed operating on either front or rear wheels or both by means of levers adjacent the handle grips.

Prior to the advent of gearshift cycles, the coaster brake variety was in appreciable demand. Two attributes of the coaster brake type of drive have been dominant, namely, the ability to set the brake on the rear wheel by merely reversing the pedaling and, for relatively level stretches, to be able to coast without pedaling for a distance as long as the initial momentum or inertial effect is capable of moving the cycle.

More recently motor assists have been devised for cycling pleasure, such motor assists commonly being made reference to as "Mopeds". The Moped type of assist consists of a relatively lightweight motor drive for either the front or rear wheel of the cycle, not actually heavy enough to dispense with pedaling the cycle except for travel on the level, but primarily to make pedaling easier when the operator needs to buck the wind or travel up a relatively modest grade. Such motor assist appliances of necessity must be supplied with energy such as gasoline for a combustion engine or a 12-volt relatively heavy battery in the event the motor assist is electrically operated. In either event, the source of energy must be carried along and be capable of being replenished.

It is accordingly among the objects of the invention to provide a new and improved spring assist for cycles in which energy is built up in a spring by the conventional pedaling operation and stored there until there is some wish to make use of the energy by the operator while the ride is in operation.

Another object of the invention is to provide a new and improved spring assist for cycles wherein pedaling is the sole source of energy built up in a spring drive in such fashion that once built up, operation of the spring drive can be canceled out merely by continued pedaling in the normal fashion without substantial change in the pedaling function.

Still another object of the invention is to provide a new and improved spring drive for cycles wherein a spring assist can be called upon by the operator to replace the pedaling operation merely by ceasing normal pedaling whereupon the spring drive is capable of taking over.

Still another object of the invention is to provide a new and improved spring drive for cycles wherein the building up of energy in the spring is commenced under very easy circumstances to the extent that the same spring drive can be used equally successfully by operators of no more than modest strength and skill or in the alternative, by operators of appreciable strength and ability who might prefer to call upon the spring assist only rarely during a ride.

Still further among the objects of the invention is to provide a new and improved spring assist device for cycles of such character that it can be installed as after market equipment on virtually any type of bicycle or tricycle, the equipment moreover being provided with safety equipment irrespective of the tension in the spring, making employment of the device substantially accident free.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

In the drawings:

FIG. 3 is a fragmentary side-elevational view on the line 3—3 of the FIG. 1.

FIG. 4 is a fragmentary cross-sectional view on the line 4—4 of FIG. 3.

FIG. 5 is a fragmentary view of the spring cage.

Figure 1:
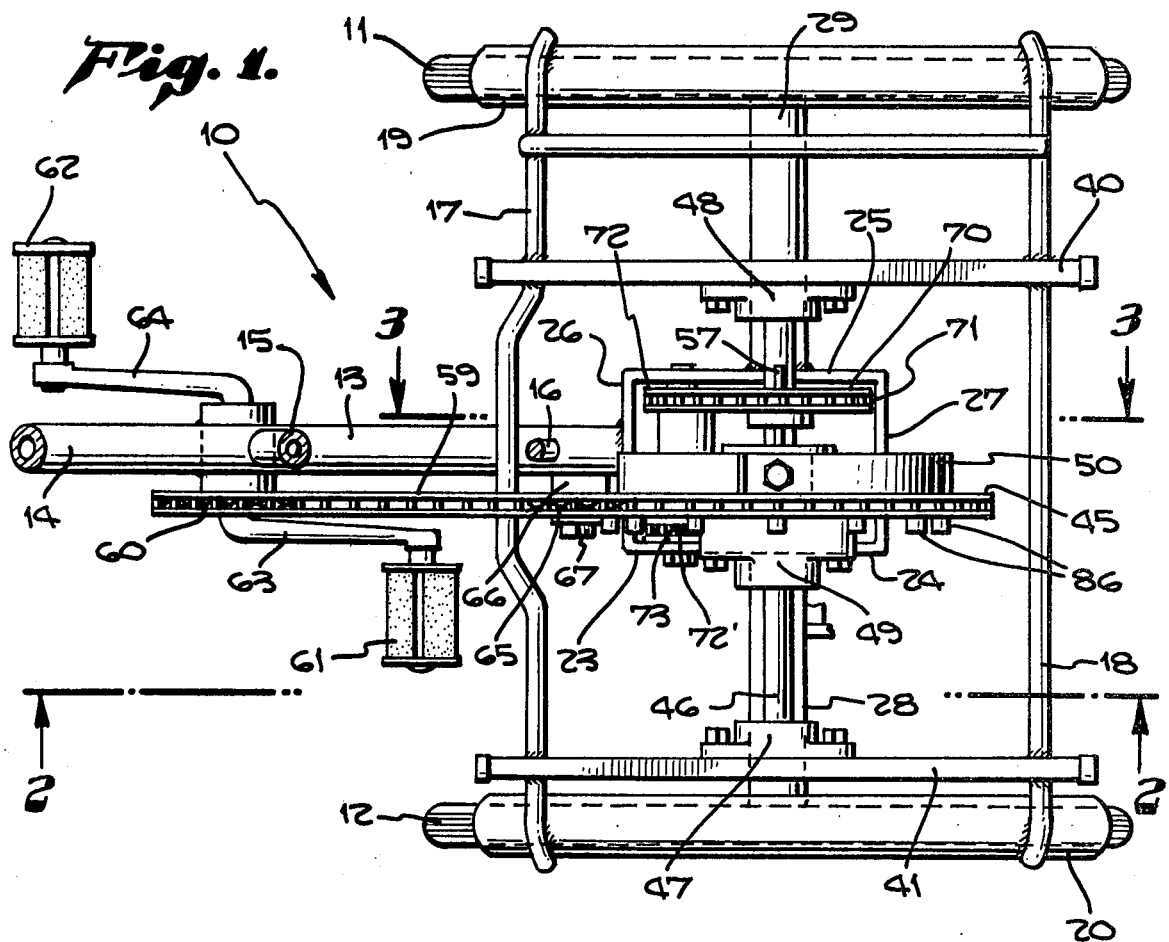
FIG. 1 is a plan view of a conventional tricycle in which the invention is embodied.
Figure 2:
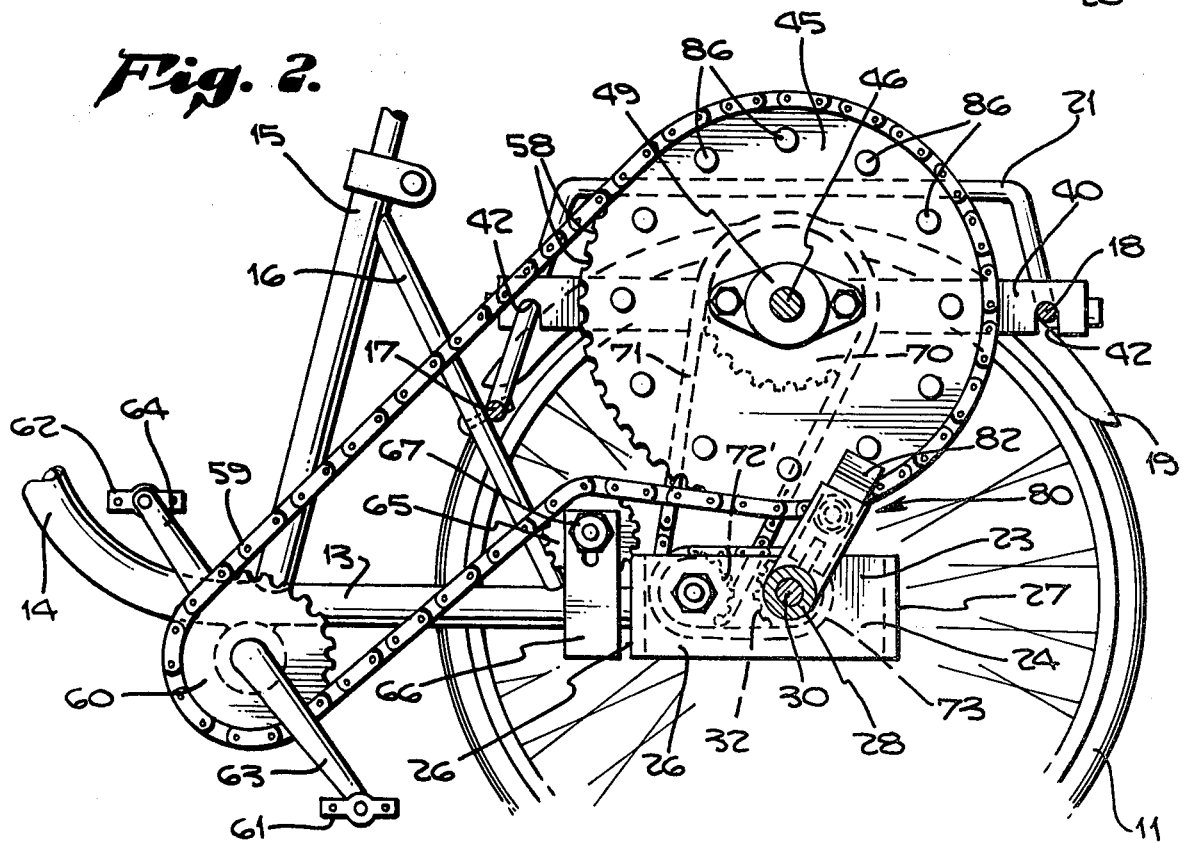
FIG. 2 is a fragmentary side-elevational view on the line 2—2 of FIG. 1.

In an embodiment of the invention chosen for the purpose of illustration there is shown a pedal operated vehicle indicated generally by the reference character 10 which, in the present instance is in the form of a tricycle, having two rear wheels 11 and 12 supported upon a frame 13, a forward portion 14 of which is adapted to support a front steerable wheel (not shown), and an upwardly extending portion 15 of which is for mounting a conventional seat (not shown). A diagonal brace 16 extends between the portion 15 and the frame 13. It is also of consequence to note forward and aft supports 17 and 18, respectively, to which are attached fenders 19 and 20, and a fore and aft brace 21, the forward portion 17 being bolted to the diagonal brace 16.

A box 23 is attached at the rear of the frame 13, the box having side walls 24 and 25 together with fore and aft end walls 26 and 27, respectively. Tubular supports 28 and 29 are welded respectively to the side walls 24 and 25. Within the tubular support 28 is a drive shaft 30 for the wheel 12, there being a similar shaft 31 for the wheel 11. For driving the wheel 12 there is provided a drive wheel sprocket 32, the other wheel 11 being an idler.

The spring assist drive forming the subject matter of the present invention is one adapted to be added to a substantially conventional tricycle such as has been described herein in adequate particular. For mounting the spring assist drive there are provided beams 40 and 41 laterally spaced and extending in a fore and aft direction so that forward ends of the beams are supported by the forward support 17 and rear or aft ends supported by the aft support 18. Attachment of the beams to the supports can be by appropriate conventional welding.

The spring assist drive comprises in the main a spring cage 45 through which extends a spring power shaft 46, the shaft 46 being journaled at one end in a bearing 47 attached to the beam 41 at the end and at the other end in a bearing 48 attached to the beam 40. An intermediate bearing 49 is attached to the spring cage 45.

For storing energy in the spring assist drive there is provided a spirally coiled power spring 50. An outside end 51 of the spring is bolted to a lug 52 on the spring cage 45 by means of a bolt 53. The inside end 54 of the spring is attached to a center block 55 by a screw 56, the center block being keyed to the spring power shaft 46 by means of a key 57.

Teeth 58 on the outside perimeter of the cage 45 comprise a spring wind sprocket. The spring wind sprocket is connected by means of a drive chain 59 to a power sprocket 60. The power sprocket is motivated by pedals 61 and 62 at the ends of respective arms 63 and 64. To adjust tension in the chain 59 there is provided an idler sprocket 65 adjustably mounted upon a bracket 66 by means of a bolt 67, the bracket being mounted on the frame 15.

In order to transfer power built up in the spring 50 ultimately to the driven wheel 12 there is keyed to the shaft spring power 46 a spring power sprocket 70. Acting through a first transfer chain 71 the spring power sprocket 70 is connected to an intermediate transfer sprocket 72. For the final transfer of power there is provided a second transfer chain means 73 connecting with the drive wheel sprocket 32 previously identified. Being keyed to the drive shaft 30, rotation of the drive wheel sprocket serves to drive the rear wheel 12.

In operation, when the operator desires to ride the tricycle on which the spring assist drive has been installed, the pedals 61 and 62 are foot rotated in the conventional fashion. Initially, rotation of the power sprocket 60 by pedal action acting through the drive chain 59 and the teeth 58 on the spring cage serving as a spring wind sprocket winds up spring 50. Winding action in the chosen example starts at the other end of the coil spring 50, the first few revolutions of the power sprocket serving primarily to put tension in the spring 50 or in other words build up energy in the spring. Before, however, the spring 50 becomes tightly wound the effect of pedaling will be transferred to the spring power shaft 46 which is keyed to the center block 35 to which in inside end 54 of the spring 50 is attached. Then, as pedaling continues, the various chains continue to be rotated transferring pedal action through the sprockets 70 and 72 and 32 to the drive shaft 30 of the wheel 12 and in that way to move the tricycle forward at whatever the pace the operator might choose. When the operator discontinues pedaling, energy built up in the spring 50 and acting on the inside end 54 of the spring causes the block 55 to rotate and this in turn rotates the shaft 46, rotation of which is then transferred by the same chains and sprockets to the drive shaft 30 and rear wheel 12. The rear wheel accordingly will continue to move the tricycle in the forward direction as long as there is sufficient energy in the spring 50 to accomplish this, following which the tricycle will coast to a stop unless the operator continues pedaling.

So that the pedals 61 and 62 will not be spun in reverse direction, once the spring 50 has been placed under tension and the operator should remove his feet from the pedals, there is provided a ratchet 80. One simple form of ratchet makes use of a lug 81 welded to the tubular support 28, there being a ratchet arm 82 pivotally attached to the lug 81 by means of a pivot pin 83. Acting against the ratchet arm is a spring 84 retained against a spring keeper 85 which presses the ratchet arm 82 into an engagement with one or another of the ratchet pins 86 on a rear face 87 of the spring cage 45.

While a particular embodiment of the present invention has been shown and described, it will be obvious to those skilled in the art that changes and modifications may be made without departing from the invention in its broader aspects, and therefore, the aim of its appended claims is to cover all such changes and modifications as fall within the true spirit and scope of this invention.

Having described the invention, what is claimed as new in support of Letters Patent is as follows:

1. A spring assist drive for a peddle operated vehicle of the cycle type which has a frame for a front steerable wheel and seat, a rear drive wheel assembly comprising a drive wheel sprocket with drive shaft, foot pedals on appropriate pedal arms and a power sprocket motivated by said pedals serving as parts of said vehicle of conventional structure and relationship, said spring assist comprising a spring cage on the frame, a spirally wound coil spring for said cage, said spring having an inner and an outer end, a spring power sprocket, a spring power shaft rotatably mounting said spring power sprocket on said frame and a spring wind sprocket anchored to said cage at a location above and no further forward than said drive wheel sprocket, the location of the axis of rotation of said spring wind sprocket being spaced from the location of the axis of rotation of said drive wheel sprocket, said coil spring having the inner end fixed on said spring power shaft and the outer end attached to said cage adjacent the perimeter, an endless drive chain interconnecting said power sprocket with said spring wind sprocket, and a transfer chain means between said spring power sprocket and said drive wheel sprocket comprising a continuous permanent operating drive from said power sprocket whereby the energy built up in the spring has a continuously expendable auxiliary driving engagement with said drive wheel.

2. A spring assist drive as in claim 1 wherein there is a ratchet acting between said frame and the spring wind sprocket to prevent reverse application of spring power to said power drive sprocket.

3. A spring assist drive as in claim 1 wherein there is a chain tension adjustment means on said frame.

4. A spring assist drive as in claim 1 wherein said spring wind sprocket is an integral part of said cage.

5. A spring assist drive as in claim 1 wherein said spring cage is at a location above both said power sprocket and said drive wheel sprocket.

6. A spring assist drive as in claim 1 wherein there is an intermediate transfer sprocket and a portion of said transfer chain means extends between said intermediate transfer sprocket and said spring power sprocket, and another transfer sprocket and accompanying second portion of said transfer chain means between said other transfer sprocket and said drive wheel sprocket.

* * * * *